(12) United States Patent
Belli

(10) Patent No.: US 6,595,539 B1
(45) Date of Patent: Jul. 22, 2003

(54) TWO-WHEELED VEHICLE WITH FRAME WHICH CAN BE FOLDED UP BY ACTUATION CONTROL AND TRANSMISSION MEANS

(76) Inventor: Alessandro Belli, Via Volta 17, Milan (IT)

( * ) Notice: Subject to any disclaimer, the term of this patent is extended or adjusted under 35 U.S.C. 154(b) by 0 days.

(21) Appl. No.: 09/600,604
(22) PCT Filed: Jan. 27, 1999
(86) PCT No.: PCT/EP99/00500
§ 371 (c)(1), (2), (4) Date: Jul. 19, 2000
(87) PCT Pub. No.: WO99/38759
PCT Pub. Date: Aug. 5, 1999

(30) Foreign Application Priority Data

Feb. 2, 1998 (IT) .......................... MI98A0191

(51) Int. Cl.⁷ ................................. B62M 9/00
(52) U.S. Cl. ...................... 280/287; 280/278
(58) Field of Search .............. 280/287, 278, 280/87.05

(56) References Cited

U.S. PATENT DOCUMENTS

| 3,990,717 | A | | 11/1976 | Best | |
|---|---|---|---|---|---|
| 4,296,940 | A | * | 10/1981 | Herbert | 280/287 |
| 4,433,852 | A | * | 2/1984 | Hon | 280/287 |
| 4,540,190 | A | * | 9/1985 | Moulton | 280/287 |
| 4,824,131 | A | | 4/1989 | Thay | |
| 6,032,971 | A | * | 3/2000 | Herder | 280/287 |
| 6,196,566 | B1 | * | 3/2001 | Zhang | 280/287 |

FOREIGN PATENT DOCUMENTS

GB  2021055  11/1979

* cited by examiner

Primary Examiner—Lesley D. Morris
Assistant Examiner—Matthew Luby
(74) Attorney, Agent, or Firm—Ladas & Parry

(57) ABSTRACT

Foldable two-wheeled vehicle comprising a frame in which there is provided at least one central body (10), at least one group (20) supporting the rear wheel (21), at least one group (60) supporting the front wheel (61) and at least one group (50) for steering the front wheel (61), which are respectively hingeably joined to the central body (10), there being provided means for controlling (70) and actuating (L72,L73, L74, L75,L76) the rotation of groups (20,50,60) around the central body (10), so as to close/open the frame from an open configuration suitable for use to a closed configuration suitable for transportation and vice versa.

23 Claims, 3 Drawing Sheets

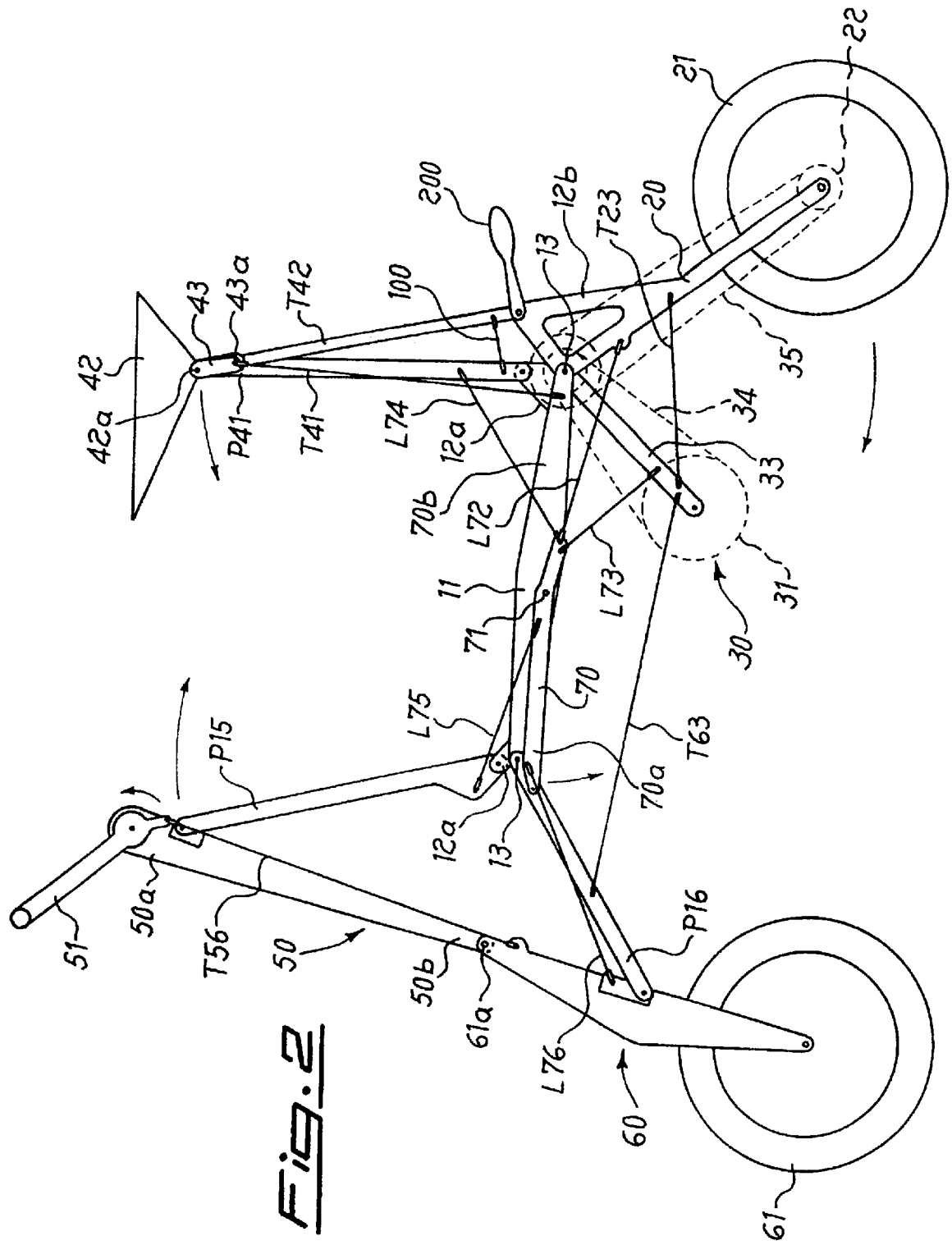

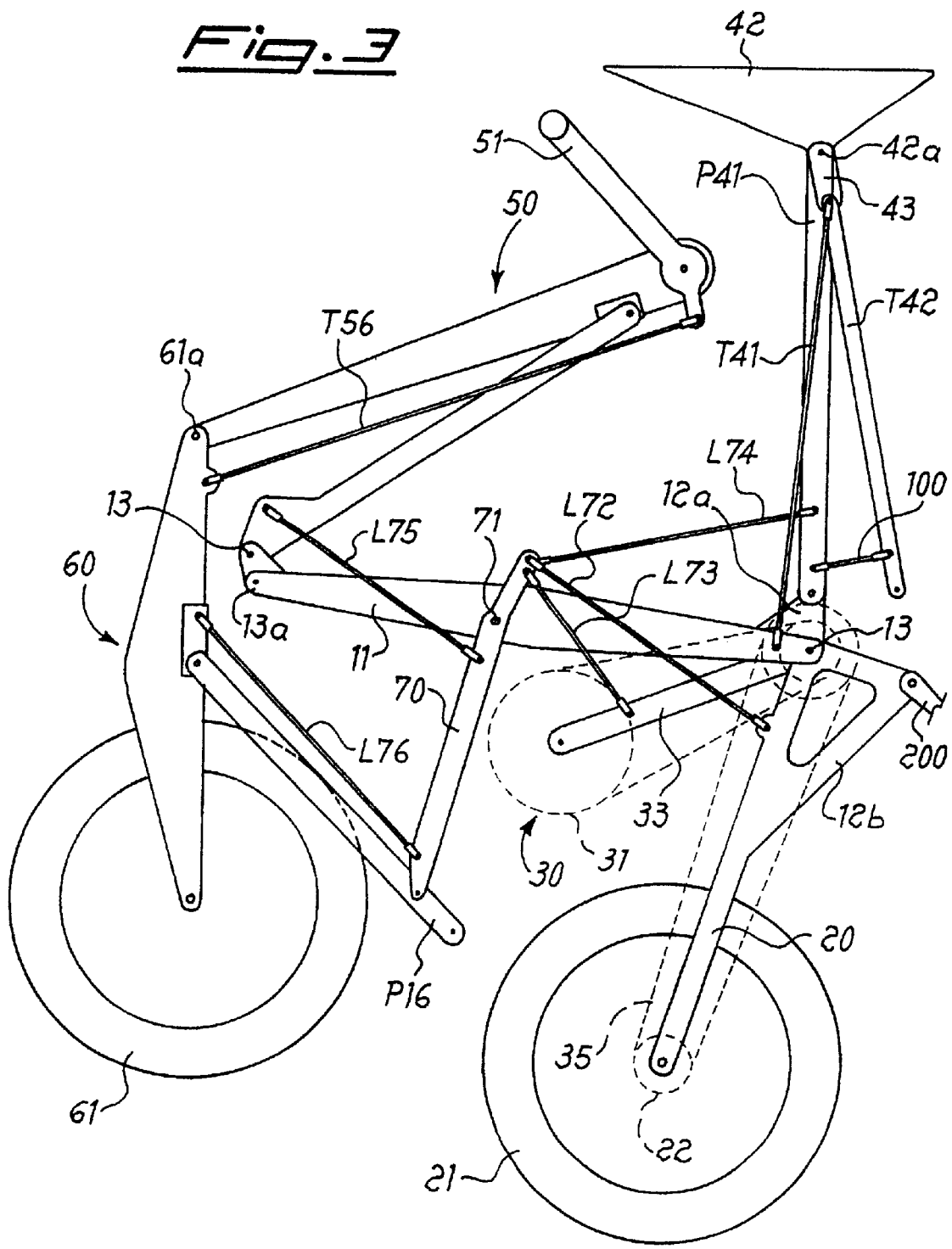

TWO-WHEELED VEHICLE WITH FRAME WHICH CAN BE FOLDED UP BY ACTUATION CONTROL AND TRANSMISSION MEANS

DESCRIPTION

The present invention relates to a two-wheeled vehicle provided with a frame which can be folded up by means of associated means for control of the actuation and transmission.

It is known that in the production of frames for two-wheeled vehicles, in particular bicycles, the established technology consists in the manufacture of a frame of the traditional type formed by tubes which are made of various materials and welded together.

These frames, although they have managed to achieve a very high ratio in terms of their own weight against the carrying weight, are such, however, that neither their weight nor their overall dimensions can be further reduced to a significant degree. It is also known that there has always been a need to obtain a folding frame which is such that the overall dimensions can be reduced so as to allow easier transportation by the user both over one's shoulder and on-board other vehicles. There have been numerous designs of bicycles where folding has been based on the division of the frame into two sections, essentially a front section and a rear section, which can be rotated about a central hinging axis parallel to a longitudinal plane of symmetry of the bicycle which is essentially vertical and passes through the two wheels when they are aligned with one another.

A frame for two-wheeled vehicles is also known from IT-1,248,931 in the name of the same Proprietor, said frame consisting of a reticular structure forming functional sections such as the steering, the pedal group, the saddle group and the forks for the wheels.

The technical problem which is posed, therefore, is that of providing a frame for two-wheeled vehicles such as bicycles, mopeds and the like, which is low-weight, functionally equivalent to a normal frame and can be folded up into its smallest size and opened out into its normal size through an automatic and repeatable sequence of displacements without the need for co-ordination of the operations by the user. Within the scope of this problem, a further requirement is that the frame should be easy and inexpensive to produce industrially and to assemble.

These technical problems are solved according to the present invention by a foldable two-wheeled vehicle comprising a frame in which there is provided at least one central body, at least one group supporting the rear wheel, at least one group supporting the front wheel and at least one group for steering the front wheel, which are respectively hingeably joined to the said central body which comprises means for controlling and actuating the rotation of said groups around said central body, so as to cause automatically the correct sequence of displacement from an open configuration suitable for use to a closed configuration suitable for transportation and vice versa.

Further details may be obtained from the following description of a non-limiting example of embodiment of the invention provided with reference to the accompanying drawings, in which:

FIG. 2 shows a cross-section along a longitudinal plane of symmetry of the bicycle illustrated in FIG. 1;

FIG. 3 shows a cross-sectional view of the bicycle according to the invention, similar to that of FIG. 2, with the frame half-folded.

Figure 1:
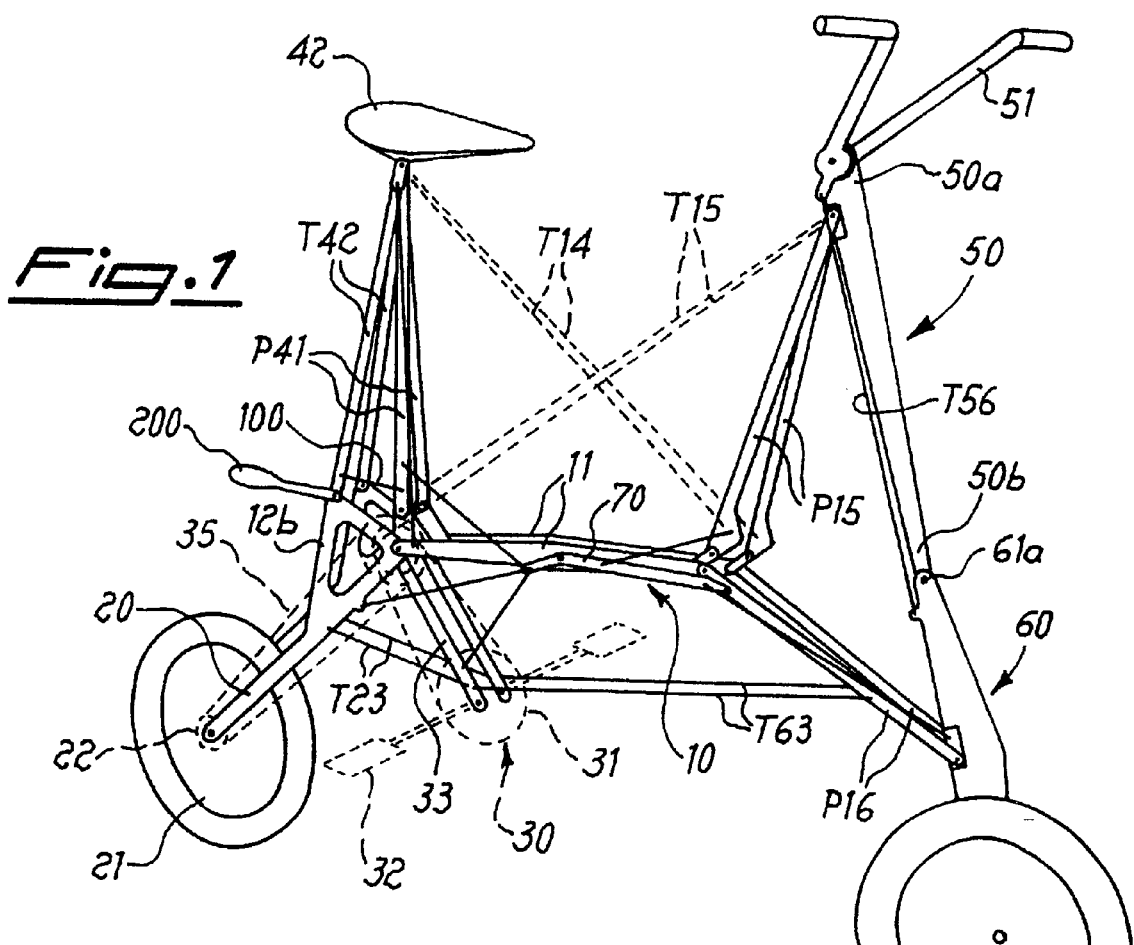
FIG. 1 shows a perspective view of a bicycle with a frame according to the invention in the condition where it is totally open, ready for normal use.

As illustrated in FIG. 1, the frame for two-wheeled vehicles according to the invention is composed of a central body 10 formed by two parallel bars 11, the respective opposite ends of which are connected together in the transverse direction by pins 13.

Said pins 13 have also pivotably mounted on them corresponding gussets 12a and 12b, i.e. front gussets and rear gussets, respectively, which are arranged on opposite sides and on the outside of the said bars 11.

A pair of struts P15 for connecting the section 10 to a steering bar 50 are also connected to the front gussets 12a.

A further pair of struts P16 connects a group 60 forming the fork of the front wheel 61 to a lever 70 which is pivotably mounted between the bars 11 as described in detail further below. The end of said struts P16 opposite to the end fastened to the front fork is designed to engage into a corresponding seat 13a of the pin 13 so as to cause locking thereof.

The handlebar 51 is joined to one end 50a of the steering bar 50 by means of associated transverse pins, while the other end 50b of the steering bar is joined, by means of a pin 61, to the fork 60 of the wheel 61.

The opposite ends of a tie-rod T56 are respectively pivotably mounted on the steering bar 50 and the fork 60, so as to connect the two parts.

The fork 20 of the rear wheel 21 is pivotably mounted on the rear pin 13.

Two struts P41 are also pivotably mounted on said gussets 12b, the saddle 42 being mounted on the top end of said struts by means of a pin 42a.

The same pin 42a of the saddle also has pivotably mounted on it one end of a connecting rod 43, the other end of which is joined to a connecting-rod pin 43a, with which a tie-rod T41 connecting the saddle group to the bar 11 of the group 10 and a tie-rod T42 connecting the saddle group to the rear fork are also hinged; the strut P41 and the tie-rod T42 are connected together by a lever 100 for coordinating the relative movement.

The rear fork 20 and the front fork 60 have, arranged between them, pairs of tie-rods T23 and T63 for supporting the pedal group 30 comprising a gear 31 from which the pedals 32 extend and which is rotatable by means of a bracket 33 about the rear pin 13, said gear 31 being connected to the pinion 22 of the rear wheel by means of a transmission 34 and a belt 35.

The load-bearing structure of the bicycle is completed by further tie-rods T14 and T15 arranged between the central section 10 and the saddle group 40 and the steering group 50, respectively.

As illustrated in greater detail in the cross-section of FIG. 2, the said lever 70 is arranged inside the central group 10 and rotates about a fixed pin 71 arranged transversely with respect to the two bars 11.

Further pairs of rods are pivotably mounted on the opposite ends 70a and 70b of the lever 70, i.e.:

L76 connecting the end 70a to the fork 60 of the front wheel 61;

L75 connecting the lever 70 to the strut P15 of the steering group 50;

L73 connecting the end 70b of the lever 70 to the bracket 30 of the pedal group 30;

L72 connecting the end 70b of the lever 70 to the rear fork 20;

L74 connecting the end 70b of the lever 70 to the struts P41 of the group 40 supporting the saddle 42.

Said rods, as will emerge more clearly below, allow automatic folding of the frame into a totally closed configuration illustrated in FIG. 4 to be obtained.

In the totally open position ready for use, the bicycle is kept locked by means of a lever 200 designed to cause reaction of the strut P16 against the seat 13a of the front pin 13 which ensures locking of all the component parts of the bicycle.

Figure 4:
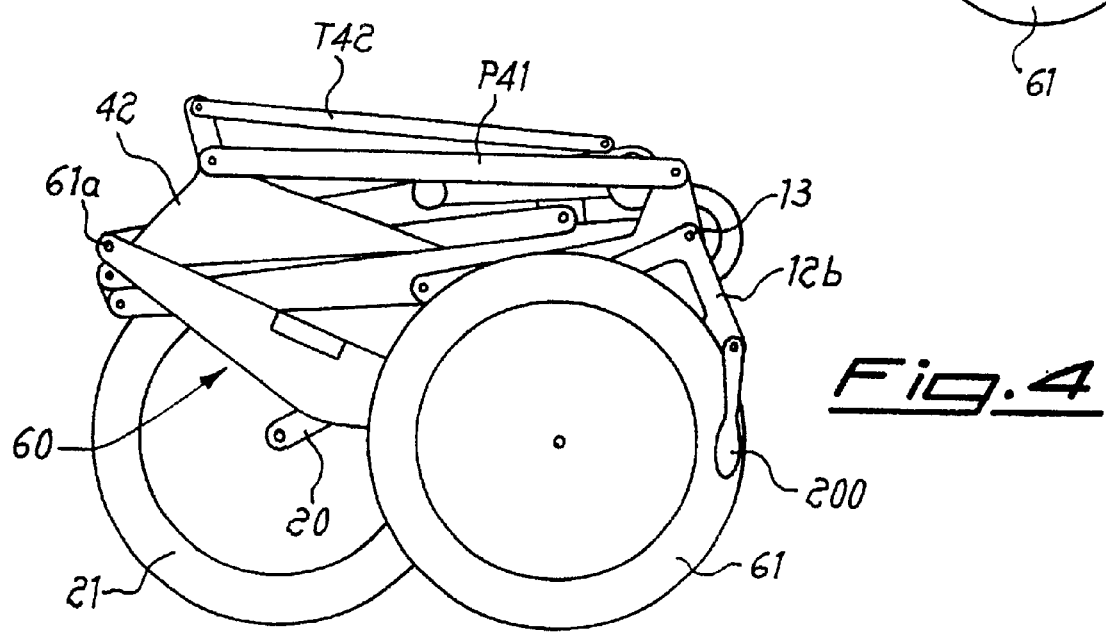
FIG. 4 shows a cross-sectional view, similar to that of FIG. 2, with the frame fully folded.

More in detail and with reference to FIG. 3, the frame is operated in the following manner:

starting from a totally open position illustrated in FIG. 1, the handle 200 is rotated so as to release the tie-rods T41 from the rear fork 20 and eliminate the locking force on the struts P16 which are now free to disengage from the pin 13 of the central group 10; and the control lever 70 is operated, causing it to rotate in an anti-clockwise direction about the pin 71;

during its rotation, the lever 70 causes rotation also of all the rods L72, L73, L74, L76 which, reacting against the respective parts connected to them, cause closing of the frame into the configuration shown in FIG. 4.

The pedals may be folded equally well at the start or at the end of the closing sequence so as to eliminate the associated transverse volume which is occupied.

It must be emphasized that all the moving parts rotate substantially simultaneously, but at different speeds so as to cause automatically the correct sequence of displacements which allow closing of the frame without relative interference.

All the rotations of the individual moving parts occur moreover in planes which are substantially parallel to the longitudinal plane of symmetry of the frame and about pins substantially perpendicular to said plane.

It is therefore obvious how the combination consisting of the frame and the means for rotational actuation of the individual parts allows easy, automatic and repeatable closure of the vehicle according to the invention without the need for complicated operations by the user.

In addition to this, it is also envisaged that said control means 70 for opening/closing thereof may be servo-assisted by corresponding means of the elastic or electromechanical type.

What is claimed is:

1. Foldable two-wheeled vehicle having a front and rear wheel comprising:

a frame in which there is provided at least one central body; at least a supporting group of the rear wheel; at least a supporting group of the front wheel; at least a steering group for the front wheel, said groups being hingeably joined to the said central body; and a single means for controlling and actuating the rotation of said groups around said central body, so as to automatically and simultaneously cause the correct sequence of displacement of said groups from an open configuration, suitable for use, to a closed configuration suitable for transportation, and vice versa.

2. Vehicle according to claim 1, wherein said groups of the frame are hingeably joined to said central body by pins, said pins being arranged in a direction substantially perpendicular with respect to a longitudinal plane of symmetry of the vehicle.

3. Vehicle according to claim 2 wherein said pins are arranged transversely with respect to a longitudinal plane of symmetry of the vehicle.

4. Vehicle according to claim 1, wherein said means for controlling and actuating the rotation of said groups consists of a control lever hingeably mounted on a fixed pin integral with said central body.

5. Vehicle according to claim 3, wherein at least one pair of said pins has an external seat designed to engage with a corresponding end of a pair of struts arranged between the group supporting the front wheel and the said control means.

6. Vehicle according to claim 1, wherein said means for actuating the rotational movements of the various groups consist of transmission rods, at least one end of which is pivotably mounted on said control means.

7. Vehicle according to claim 4, wherein said lever has hingeably mounted on it the first ends of two transmission rods, the other ends of which are respectively hingeably joined to the group supporting the front wheel and to the steering group.

8. Vehicle according to claim 4, wherein said lever has pivotably mounted on it a first end of a transmission rod, the other end of which is pivotably joined to the group supporting the rear wheel.

9. Vehicle according to claim 3, wherein a pair of struts arranged between the central section and the steering group is rotationally connected to said pins in the front.

10. Vehicle according to claim 1, wherein the steering group and the group supporting the front wheel are pivotably joined together and connected by a tie-rod for coordinating the relative movement.

11. Vehicle according to claim 1, further comprising a group supporting a saddle and a group actuating one of the two wheels.

12. Vehicle according to claim 11, wherein said group supporting the saddle consists of a pair of struts, one end of which is pivotably joined to the saddle by means of a pin and the other end of which is pivotably mounted on the central body.

13. Vehicle according to claim 12, wherein said pin of the saddle has pivotably mounted on it the first end of a connecting rod, the other end of which is connected to a tie-rod arranged between the saddle group and the supporting group of the rear wheel.

14. Vehicle according to claim 13, wherein the end of said tie-rod connected to the supporting group of the rear wheel can be released therefrom by means of a release lever.

15. Vehicle according to claim 11, wherein tie-rods are arranged between said saddle group and the central body.

16. Vehicle according to claim 12, wherein said control means has pivotably mounted on it a first end of a transmission rod, the other end of which is pivotably joined to the strut of the group supporting the saddle.

17. Vehicle according to claim 11, wherein said group actuating one of the two wheels is pivotably mounted on a transverse pin of the central body.

18. Vehicle according to claim 11, wherein tie-rods are arranged between said actuating group and the two groups supporting the two front and rear wheels.

19. Vehicle according to claim 6, wherein said control means has pivotably joined to it the first ends of transmission rods, the other ends of which are respectively pivotably joined to the supporting group of the rear wheel and to the group supporting the actuating means.

20. Vehicle according to claim 11, characterized in that said means for actuating the vehicle consist of a pedal group.

21. Vehicle according to claim 1, characterized in that it is a bicycle.

22. Vehicle according to claim 1, characterized In that it is a motorcycle.

23. Vehicle according to claim 1, characterized in that said means for controlling opening/closing thereof are servo-assisted.

* * * * *